(12) United States Patent
Kato et al.

(10) Patent No.: US 7,823,921 B2
(45) Date of Patent: Nov. 2, 2010

(54) AIRBAG SYSTEM FOR MOTORCYCLE

(75) Inventors: Yuichi Kato, Saitama (JP); Hiroshi Goto, Saitama (JP); Takeshi Kuroe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

(21) Appl. No.: 11/902,908

(22) Filed: Sep. 26, 2007

(65) Prior Publication Data

US 2008/0079242 A1    Apr. 3, 2008

(30) Foreign Application Priority Data

Sep. 29, 2006    (JP)    ............................. 2006-269330

(51) Int. Cl.
  *B62J 27/00*    (2006.01)
  *B60R 21/20*    (2006.01)
(52) U.S. Cl. ................................. 280/743.2; 280/728.3
(58) Field of Classification Search .............. 280/743.2, 280/728.3
  See application file for complete search history.

(56) References Cited

U.S. PATENT DOCUMENTS

| | | | | |
|---|---|---|---|---|
| 5,564,731 A * | 10/1996 | Gallagher et al. | ......... | 280/728.3 |
| 6,007,090 A * | 12/1999 | Hosono et al. | ........... | 280/730.2 |
| 6,286,859 B2 * | 9/2001 | Derrick et al. | ........... | 280/728.2 |
| 6,334,627 B1 * | 1/2002 | Heym et al. | .............. | 280/743.2 |
| 6,443,484 B2 * | 9/2002 | Anglsperger | ............. | 280/728.3 |
| 6,669,227 B2 * | 12/2003 | Muhlbach | ................ | 280/728.2 |
| 6,749,217 B2 * | 6/2004 | Damian et al. | .............. | 280/734 |
| 6,832,778 B2 * | 12/2004 | Pinsenschaum et al. | ..... | 280/739 |
| 6,932,379 B2 * | 8/2005 | Yamazaki et al. | ........ | 280/730.1 |
| 6,932,384 B2 * | 8/2005 | Waid et al. | .................. | 280/739 |
| 6,991,254 B2 * | 1/2006 | Yanagibashi et al. | ..... | 280/730.1 |
| 7,032,923 B2 * | 4/2006 | Kurata et al. | ................ | 280/732 |
| 7,188,862 B2 * | 3/2007 | Webber | ....................... | 280/729 |
| 7,210,700 B2 * | 5/2007 | Zagrodnick et al. | ...... | 280/728.3 |
| 7,249,783 B2 * | 7/2007 | Parkinson et al. | ........ | 280/743.2 |
| 7,255,363 B2 * | 8/2007 | Horiuchi | .................. | 280/728.3 |
| 7,354,064 B2 * | 4/2008 | Block et al. | .............. | 280/743.2 |
| 7,357,407 B2 * | 4/2008 | Kuroe et al. | ............. | 280/728.2 |

(Continued)

FOREIGN PATENT DOCUMENTS

DE    19729627 A1    1/1998

(Continued)

*Primary Examiner*—Paul N Dickson
*Assistant Examiner*—Timothy S Wilhelm
(74) *Attorney, Agent, or Firm*—Birch, Stewart, Kolasch & Birch, LLP

(57) ABSTRACT

An air bag system is provided wherein a support belt for coupling an airbag to a vehicle body is accommodated in an accommodation part provided in the vehicle body. A belt cover is engaged from above so as to cover the accommodation part. The belt cover is configured to be removed from the accommodation part along with swelling and expansion of the airbag. A wire is coupled to the vehicle body inside the accommodation part so as not to be moved apart from the vehicle body over a predetermined length at the time of removing. The wire is arranged inside the accommodation part, and is coupled to a fixation plate to be connected to a frame of the vehicle body. By inserting the wire into through-holes of the fixation plate, the wire is coupled to the vehicle body, and both ends thereof are connected to the belt cover.

20 Claims, 7 Drawing Sheets

U.S. PATENT DOCUMENTS

| | | |
|---|---|---|
| 2004/0101725 A1 | 5/2004 | Kato et al. |
| 2005/0127642 A1* | 6/2005 | Weissert et al. .......... 280/728.3 |
| 2007/0057488 A1* | 3/2007 | Horiuchi et al. .......... 280/728.3 |
| 2007/0075537 A1* | 4/2007 | Rust ........................... 280/739 |
| 2007/0170704 A1* | 7/2007 | Miyata .................... 280/730.1 |
| 2007/0170709 A1* | 7/2007 | Braun et al. ................ 280/739 |
| 2008/0079244 A1* | 4/2008 | Kato et al. ............... 280/728.3 |
| 2008/0224456 A1* | 9/2008 | Kuroe et al. ............. 280/730.1 |
| 2009/0033070 A1* | 2/2009 | Dumbrique .............. 280/728.2 |

FOREIGN PATENT DOCUMENTS

| | | |
|---|---|---|
| DE | 19929762 A1 | 1/2000 |
| EP | 1118509 A2 | 7/2001 |
| JP | 2003-327182 A | 11/2003 |
| WO | WO-84/01227 A1 | 3/1984 |

* cited by examiner

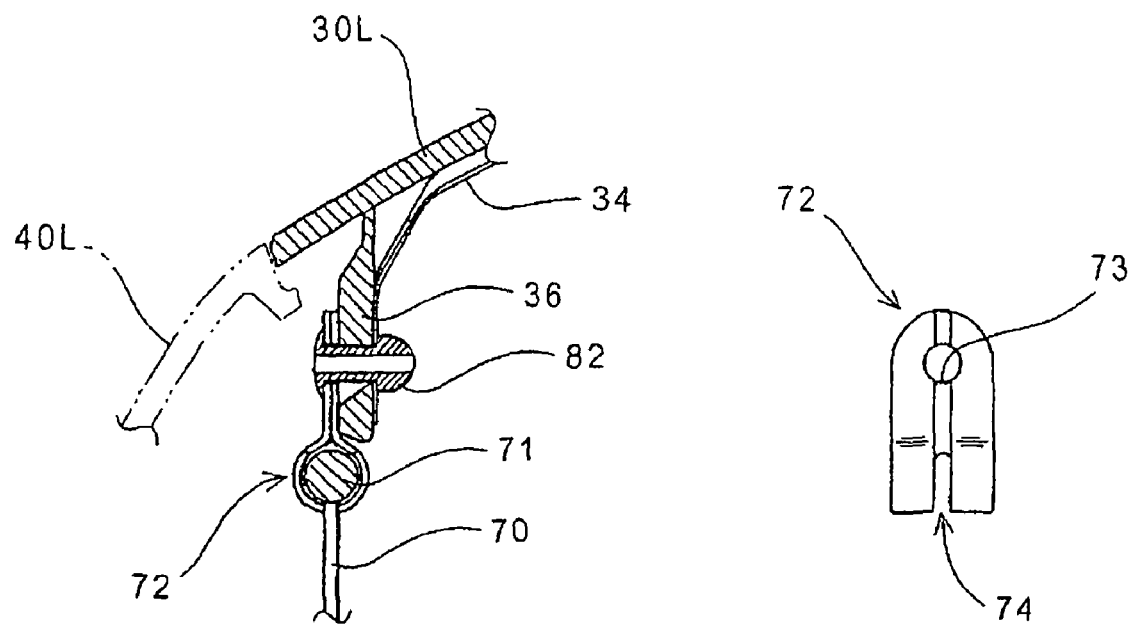
FIG. 9(a)  FIG. 9(b)
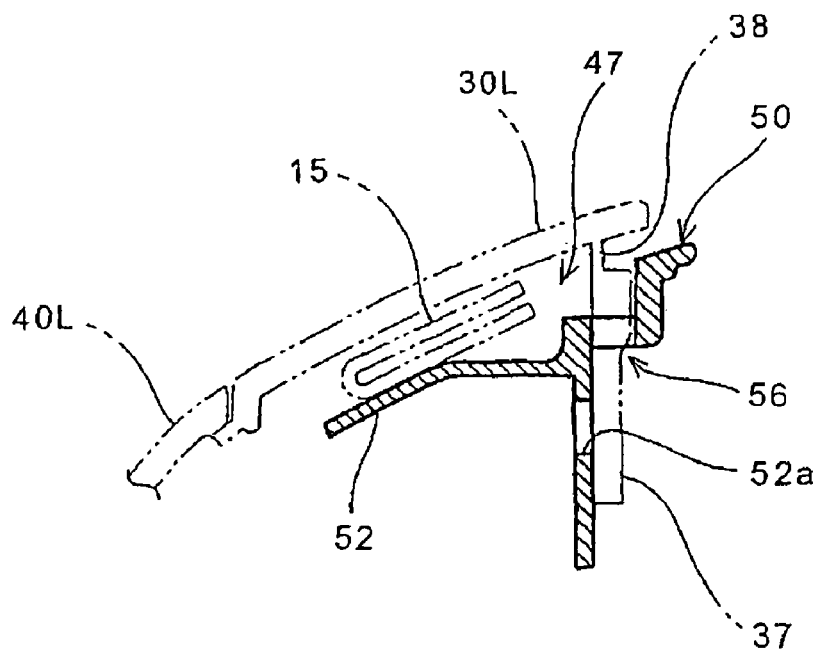
FIG. 10

AIRBAG SYSTEM FOR MOTORCYCLE

CROSS-REFERENCE TO RELATED APPLICATIONS

The present application claims priority under 35 USC 119 to Japanese Patent Application No. 2006-269330 filed on Sep. 29, 2006 the entire contents of which are hereby incorporated by reference.

BACKGROUND OF THE INVENTION

1. Field of the Invention

The present invention relates to an airbag system for a motorcycle. More particularly, to an airbag system for a motorcycle which is configured to restrict a range where covers of accommodation parts for airbag support belts are removed at the time of swelling and expansion of the airbag.

2. Description of Background Art

There have been studied from the past various devices for applying to a motorcycle an airbag by which a rider is effectively restrained when an impact exceeding a predetermined value is applied to a vehicle body. One point where motorcycles largely differ from four-wheeled vehicles is that a rider is not restrained by a vehicle body through a seat beat or the like. In response to this fact, there is known a method in which one end of a support belt is fixed to a vehicle body and the other end is coupled to an airbag. At the time of swelling and expansion of the airbag, the airbag is supported so as to be pulled from the rear side of the vehicle body.

JP-A No. 2003-327182 discloses an airbag system in which support belts for an airbag are accommodated in a pair of left and right accommodation grooves passing through leg shields, footrest parts, and a rear cover, from a front cover in a scooter-type motorcycle. According to the airbag system, since the support belts support the airbag, it is possible to effectively restrain a rider even when the yawing behavior and the rolling behavior of a vehicle body are large.

In the case where the airbag support belts as described above are applied, it is preferable to provide cover members for accommodation parts in order to protect the accommodation parts from being affected by an extra factor such as weather. However, no descriptions regarding to such cover members are provided in JP-A No. 2003-327182. As a fixing method of the cover members, there is known a method in which a plurality of projections are provided on back surfaces of the cover members so as to be engaged with engaging grooves provided in the accommodation parts. However, when the support belts are pulled out along with swelling and expansion of the airbag, the cover members are likely to drop off from the vehicle body only with such an engaging structure. Thus, there is still room for devising an attachment structure for the cover members.

SUMMARY AND OBJECTS OF THE INVENTION

An object of the present invention is to address the above-described problem of the related art, and to provide an airbag system for a motorcycle which is configured to restrict a range where covers of accommodation parts for airbag support belts are removed at the time of swelling and expansion of the airbag.

In order to achieve the above-described object, an embodiment of the present invention provides an airbag system for a motorcycle, including: accommodation parts in which support belts for coupling an airbag to a vehicle body are accommodated with covers for covering the accommodation parts from above. The covers are configured to be removed from the accommodation parts along with swelling and expansion of the airbag. String-shaped members are provided for coupling the vehicle body and the covers are provided inside the accommodation parts in order to restrict a range where the covers are removed.

Further, according to an embodiment of the present invention the airbag system for a motorcycle is provided wherein a part of each string-shaped member projects inside the corresponding accommodation part, and is coupled to a corresponding plate which is fixed to a frame of the vehicle body.

Furthermore, according an embodiment of the present invention the airbag system for a motorcycle includes string-shaped members that are wires made of metal. Plates are metal components having through-holes provided therein with the wires are inserted into the through-holes to be coupled to the vehicle body. Both ends of each wire are coupled to the corresponding cover.

According to an embodiment of the present invention, the covers are configured to be removed from the accommodation parts along with swelling and expansion of the airbag. String-shaped members are provided for coupling the vehicle body and the covers and are provided inside the accommodation parts in order to restrict a range where the covers are removed. Accordingly, when the support belts are pulled out and the covers are removed along with swelling and expansion of the airbag, it is possible to prevent the covers from dropping off from the vehicle body and from flying apart in an unexpected direction. Further, as compared to a configuration in which a hinge or the like is provided to one side of each cover, the covers can be attached with a simple structure. Furthermore, since the string-shaped members are accommodated inside the accommodation parts prior to swelling and expansion of the airbag the appearance properties of the motorcycle can be maintained.

According to an embodiment of the present invention, a part of each string-shaped member projects inside the corresponding accommodation part, and is coupled to a corresponding plate which is fixed to a frame of the vehicle body. Accordingly, as compared to a case in which the string-shaped members are coupled to exterior components whose positions are likely to be moved by an impact applied to the vehicle body, the covers can be stably held by the vehicle body.

According to an embodiment of the present invention, the string-shaped members are wires made of metal; the plates are metal components having through-holes provided therein; and the wires are inserted into the through-holes to be coupled to the vehicle body, and both ends of each wire are coupled to the corresponding cover. Accordingly, unlike a case in which the string-shaped members are coupled to exterior components made of resin and the like, the covers can be stably held by the vehicle body even when an impact and the like to be transmitted to the vehicle body and the exterior components are large. Further, while the strengths of the string-shaped members and the plates are enhanced, they both can be formed in a smaller size as compared to a case in which both are made of resin and the like. Furthermore, it is possible to couple the inside of each accommodation part to the corresponding cover with a simple structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a cross sectional view (a) taken along the line B-B of FIG. 4, and a front view (b) of a wire fastening member; and FIG. 10 is a cross sectional view taken along the line C-C of FIG. 4.

DETAILED DESCRIPTION OF THE PREFERRED EMBODIMENTS

Figure 1:
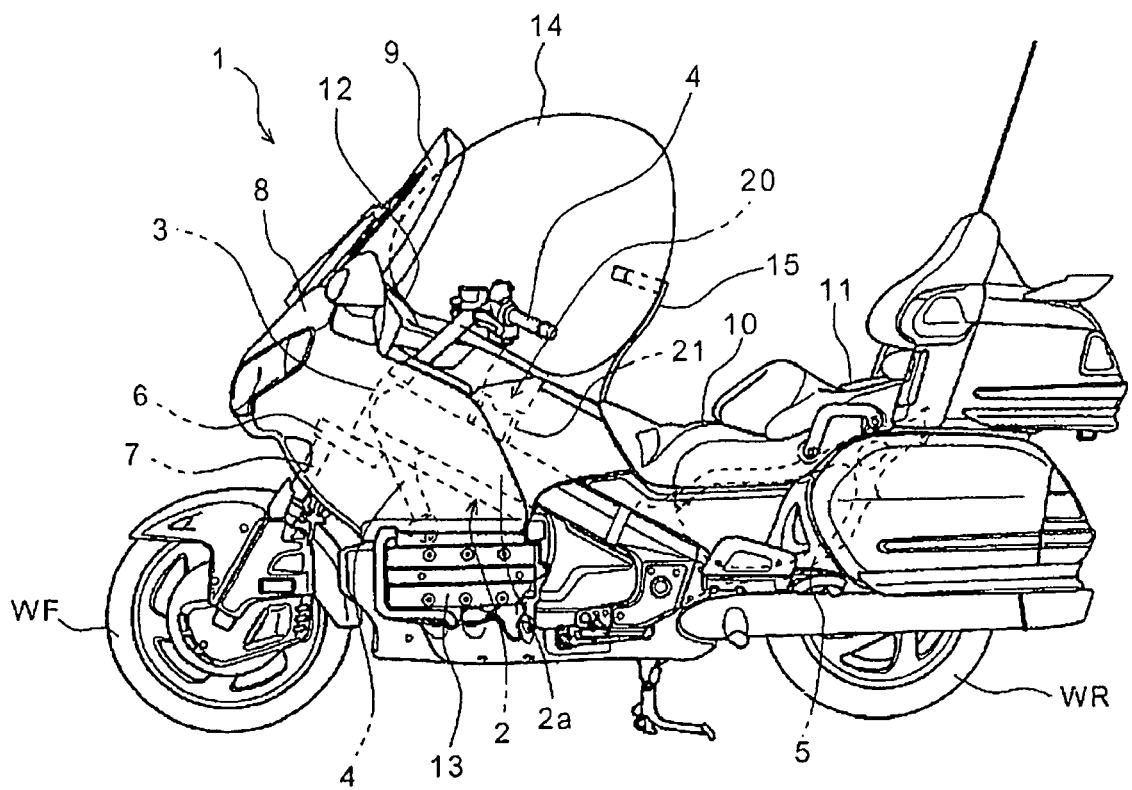
FIG. 1 is a side view of a motorcycle according to an embodiment of the present invention.

Hereinafter, a preferred embodiment of the present invention will be described in detail with reference to the drawings. FIG. 1 is a side view of a motorcycle in which an airbag system according to the embodiment of the present invention is applied. A frame 2 of a motorcycle 1 is configured mainly by a pair of left and right upper tubes 2a which extend diagonally downwardly to the rear of a vehicle body from a head pipe 3. A lower tube 4 extends downwardly from the vicinity of the head pipe 3, and an engine 13, as a driving source, is fixedly suspended from a tip end of the lower tube 4. A pair of left and right front forks 7 are steerable with a handlebar 4 are axially supported by the head pipe 3 through a lower bracket 6. A front wheel WF is rotatably journalled to lower ends of the front forks 7. A seat frame 5 for supporting a main seat 10, a rear seat 11 and the like is connected to the frame 2 on the rear side of the vehicle body. A rear wheel WR, as a driving wheel, is rotatably journalled to a rear end of a swing arm (not shown) which is swingably coupled to the frame 2.

In the motorcycle 1 according to the embodiment, there is provided an airbag 14 which, when an impact exceeding a predetermined value is applied to the vehicle body, swells and expands in a substantially spherical shape having a size ranging from the upper side of the main seat 10 to the vicinity of a wind screen 9 attached to an upper end of an upper cowl 8 while being in contact with a meter panel 12. An airbag module 20 for integrally accommodating therein the airbag 14 and an inflator (not shown) for generating a gas to swell and expand the airbag 14 is fixed to the upper tubes 2a using a support stay 21 at a forward position of the vehicle body relative to a seated position of a rider. Support belts 15 for effectively restraining a rider while keeping the airbag 14 at an appropriate position are coupled to the airbag 14 on the rear side of the vehicle body.

Figure 2:
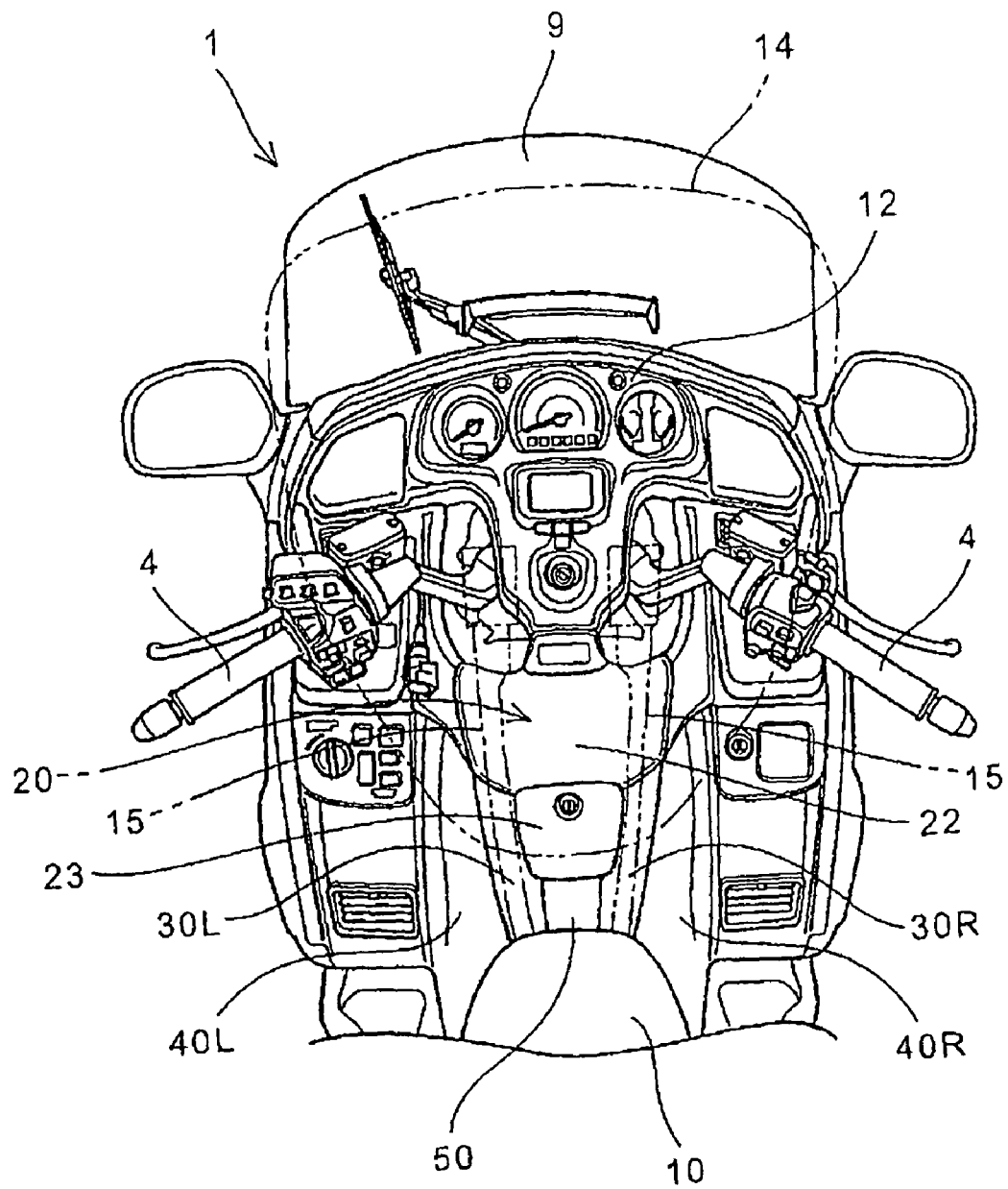
FIG. 2 is a partial top view of the motorcycle according to the embodiment of the present invention.

FIG. 2 is a partial top view of the motorcycle according to an embodiment of the present invention. Reference numerals identical to the above denote identical or equivalent parts. The airbag module 20 is configured in such a manner that the inflator and the folded airbag 14 are accommodated in a box-shaped casing (see FIG. 3), and an upper portion thereof is covered with a module cover 22. The airbag module 20 is arranged between lateral ends of the meter panel 12 on the rear side of the vehicle body and a filler lid 23 is located above a fuel tank (not shown). When the airbag 14 swells and expands, the airbag module 20 is configured in such a manner that the module cover 22 is allowed to open with one side thereof on the front side of the vehicle body serving as an axis by a gas pressure of the inflator which is instantly supplied to the airbag 14.

The filler lid 23 is openably and closably journalled to a top shelter center 50 as an exterior component. On both sides of the filler lid 23 and the top shelter center 50, there are arranged belt covers 30L and 30R as covers of accommodation parts for the support belts 15. Further outside in the vehicle-width direction, there are arranged top shelters 40L and 40R as exterior components. Along with swelling and expansion of the airbag 14, the support belts 15 are configured to expand up to the illustrated position while forcibly opening the left and right belt covers 30L and 30R. It should be noted that the module cover 22, the belt covers 30L and 30R, the top shelters 40L and 40R, and the top shelter center 50 are made of resin and the like. Lower ends of the support belts 15 are tightly fastened to lateral members of the vehicle body underneath the main seat 10.

It should be noted that the airbag 14 is formed in such a manner that a portion between attachment portions for the support belts 15 on both sides of the airbag 14, that is, a middle portion where a rider is held is formed in a concave shape having a substantially V-shaped cross section, in order to effectively wrap around a rider. Further, the airbag 14 is not only configured to be supported so as to be pulled from the rear by the support belts 15, but is also configured to be supported from the front side of the vehicle body by the handlebar 4, the meter panel 12, and the like.

Figure 3:
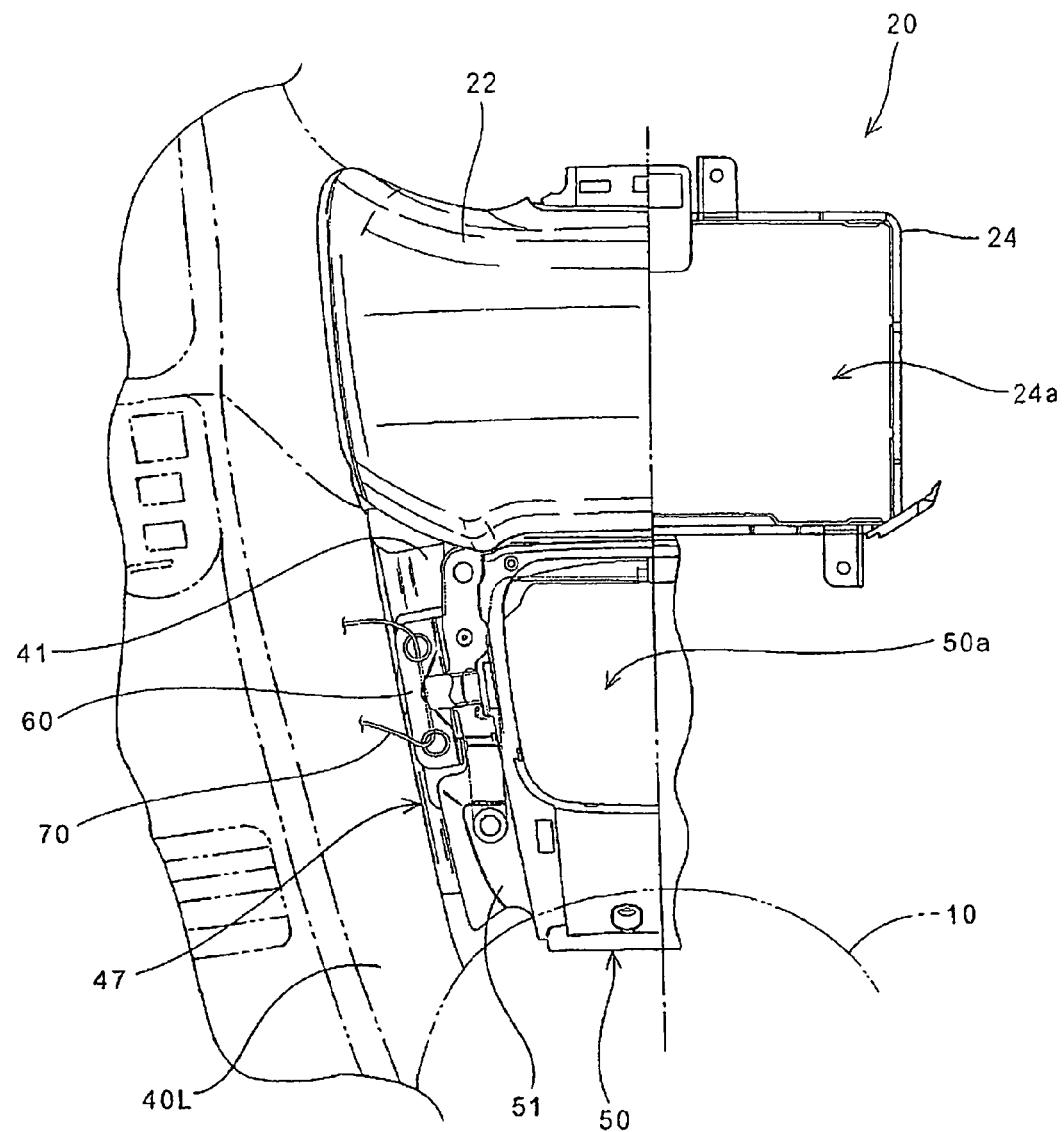
FIG. 3 is a partially enlarged view of FIG. 2

FIG. 3 is a partially enlarged view of FIG. 2. The left half of the drawing shows a state wherein the left-side belt cover 30L is removed from an accommodation part 47 for the support belt 15. The right half of the drawing shows a state wherein the module cover 22 of the airbag module 20 is detached. As described above, the airbag module 20 is configured in such a manner that the folded airbag 14 and the inflator (not shown) for swelling and expanding the airbag 14 are accommodated in the box-shaped casing 24 made of metal and the like, and the casing is covered with the module cover 22. When the airbag 14 swells and expands, the module cover 22 opens toward the front of the vehicle body, and the airbag 14 swells and expands from an opening 24a of the casing 24. It should be noted that, in the top shelter center 50 which is arranged on the rear side of the vehicle body while being adjacent to the airbag module 20, there is formed an opening 50a which is covered with the filler lid 23.

The support belts 15 and the accommodation parts 47 for the support belts 15 have a substantially bilaterally-symmetrical shape. Therefore, the explanation thereof will be made using only the left-side ones. The accommodation part 47 is formed by an extension part 41 of the left-side top shelter 40L and an overhanging part 51 of the top shelter center 50. At a substantially middle portion of the accommodation part 47, there is installed a fixation plate 60 to which a wire 70, as a string-shaped member, connected to the left-side belt cover 30L is coupled. The fixation plate 60 is arranged so as to face toward the outside in the vehicle-width direction from an opening formed in the extension part 41 of the left-side top shelter 40L.

Figure 4:
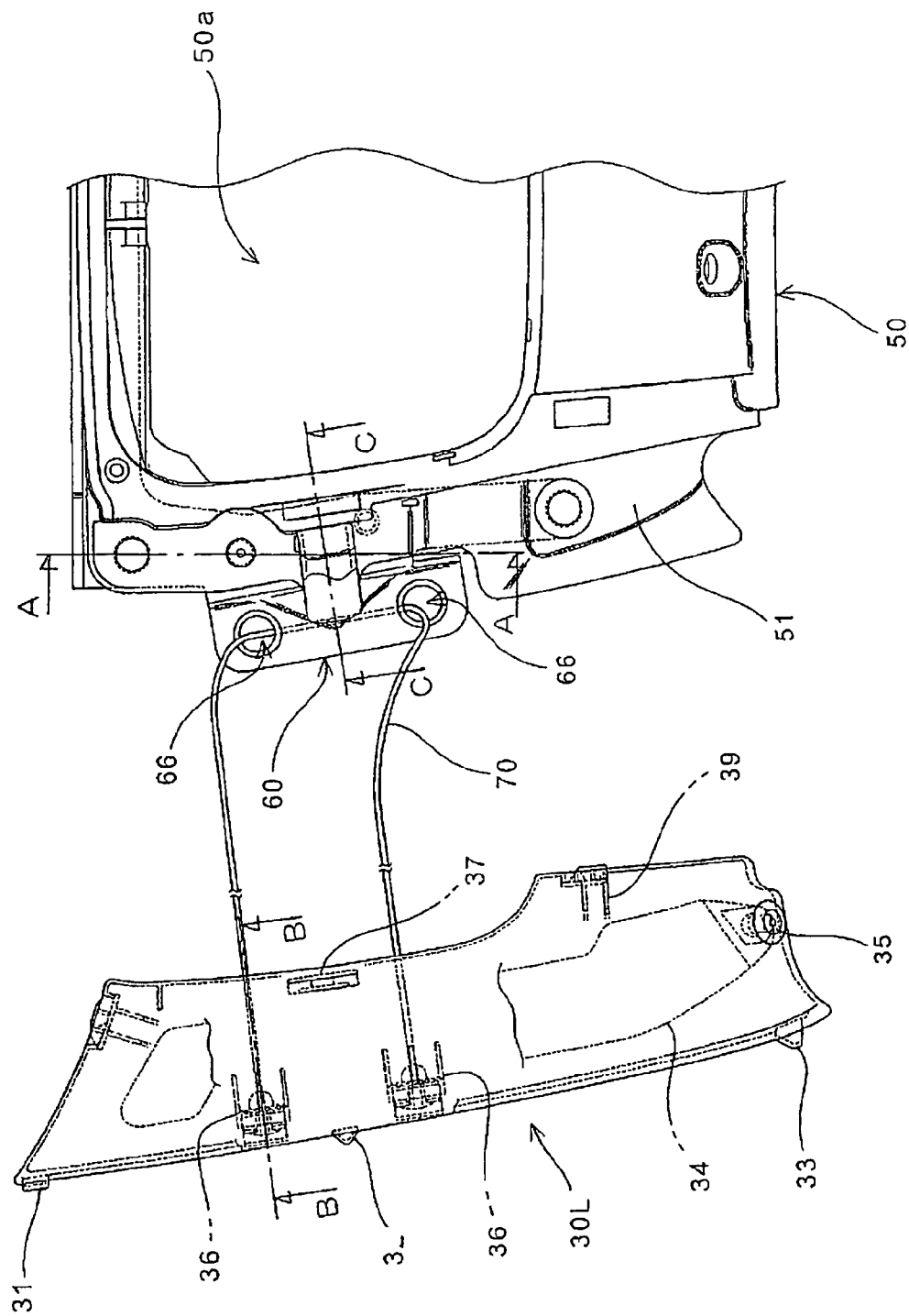
FIG. 4 is a top view showing a coupling structure of a belt cover according to the embodiment of the present invention.
Figure 5:
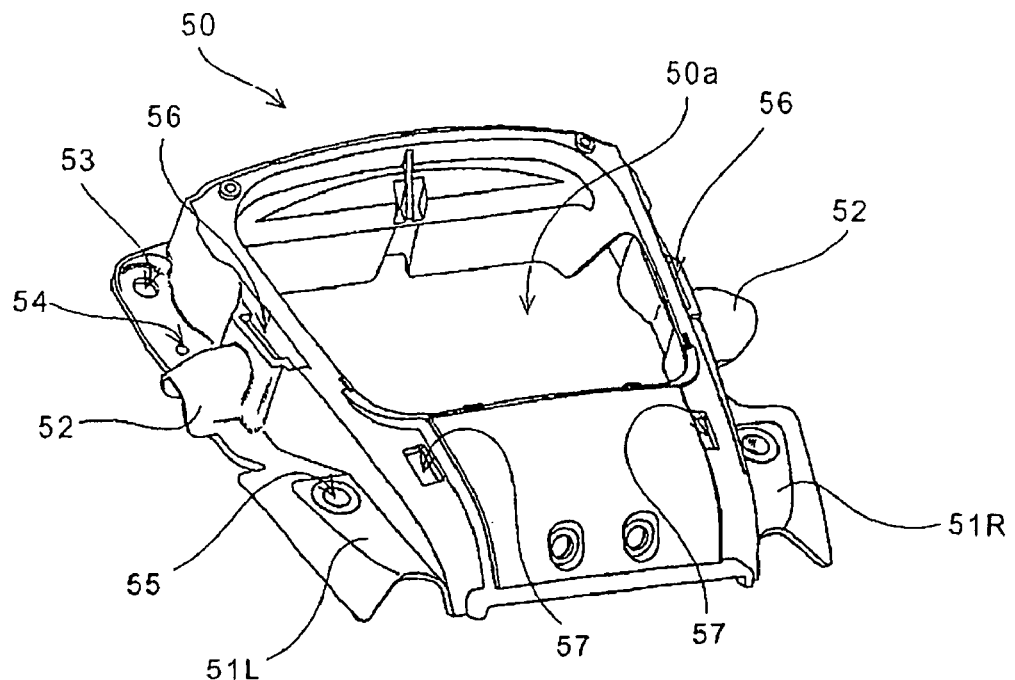
FIG. 5 is a perspective view of a top shelter center according to the embodiment of the present invention.
Figure 6:
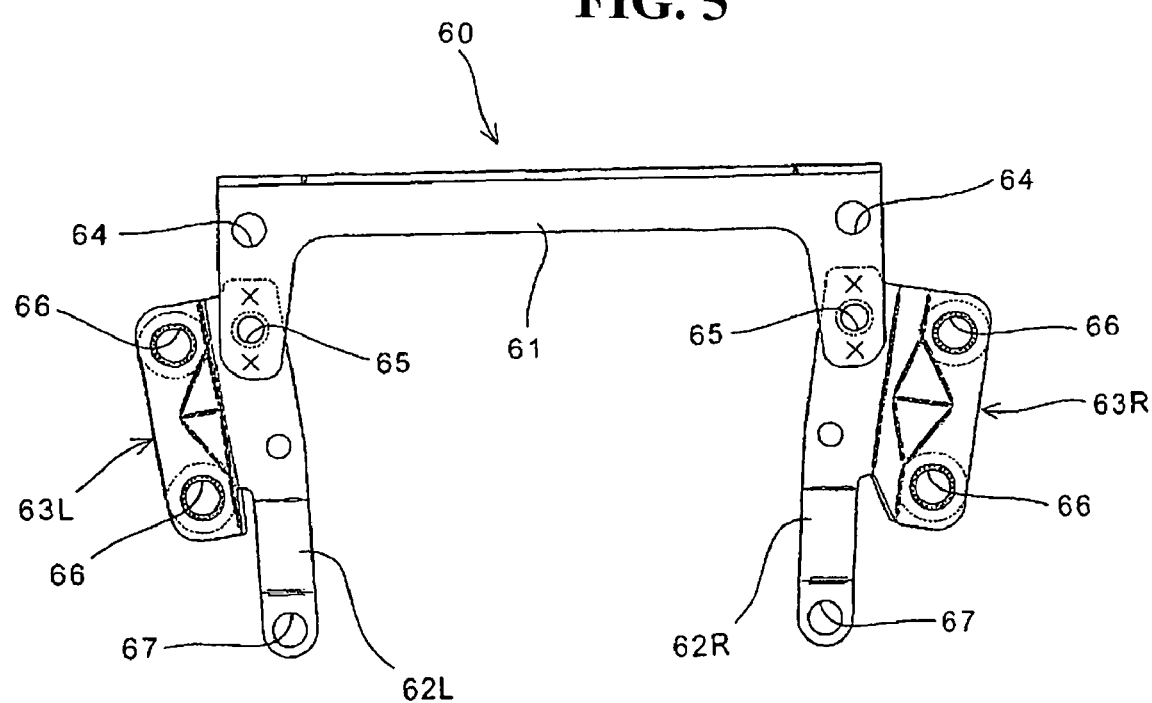
FIG. 6 is a top view of a wire coupling plate according to the embodiment of the present invention.

FIG. 4 is a top view showing a coupling structure of the belt cover according to the embodiment of the present invention. FIG. 5 is a perspective view of the top shelter center 50, and FIG. 6 is a top view of the fixation plate 60. Reference numerals identical to the above denote identical or equivalent parts. The left-side belt cover 30L has substantially the same outer shape as the accommodation part 47, and is configured to form a smooth surface continuous with the surface of the top shelter center 50 and with the surface of the left-side top shelter 40L without providing any bumps prior to swelling and expansion of the airbag 14. The left-side belt cover 30L is configured to be engaged with the accommodation part 47 through engaging pawls 31, 32, and 33 located outside in the vehicle-width direction. Stays 37 and 39 are provided in an erect manner on the back surface thereof inside in the vehicle-width direction. Both ends of the wire 70 which pass through through-holes 66 formed in the fixation plate 60 are connected to the left-side belt cover 30L through wire attachment stays 36, thereby coupling the left-side belt cover 30L to the accommodation part 47. Therefore, even when the support belt 15 is pulled out and removed from the accommodation part 47 along with swelling and expansion of the airbag 14, the left-side belt cover 30L is not moved away from the accommodation part 47 over a predetermined length of the wire 70, and a removing range is restricted. Thus, it is possible to prevent the left-side belt cover 30L from dropping off from the vehicle body and from flying apart in an unexpected direction.

On the back surface of the left-side belt cover 30L, there is arranged a belt-shaped sheet 34 which prevents the support belt 15 from directly coming into contact with the left-side belt cover 30L when the support belt 15 is accommodated. An end of belt-shaped sheet 34 on the rear side of the vehicle body is fixed to the left-side belt cover 30L through a grommet 35 as a fastening member.

With reference to FIG. 5, the top shelter center 50 integrally molded by resin and the like has a substantially bilaterally-symmetrical shape. In the top shelter center 50, there are formed left and right overhanging parts 51L and 51R configuring the accommodation parts 47 with through-holes 53, 54, and 55 used when the top shelter center 50 is fastened to the fixation plate 60 and the top shelters 40L and 40R. Engaging grooves 56 are provided into which the stays 37 of the belt covers 30L and 30R are inserted with cylindrical parts 52 formed adjacent to the engaging grooves 56. Engaging holes 57 are provided into which the stays 39 of the belt covers 30L and 30R are inserted.

With reference to FIG. 6, the fixation plate 60 is made of a metal similar to the wire 70 which is made of metal such as stainless steel, and is configured in such a manner that a middle member 61 is connected by welding to outer members 62L and 62R in which wire holding parts 63L and 63R are formed. In addition to through-holes 65, which are formed at coupling portions between the middle member 61 and the outer members 62L and 62R, through-holes 64 and 67, which are used when the fixation plate 60 is fastened to the top shelter center 50 and the top shelter 40, are formed in the fixation plate 60.

Figure 7:
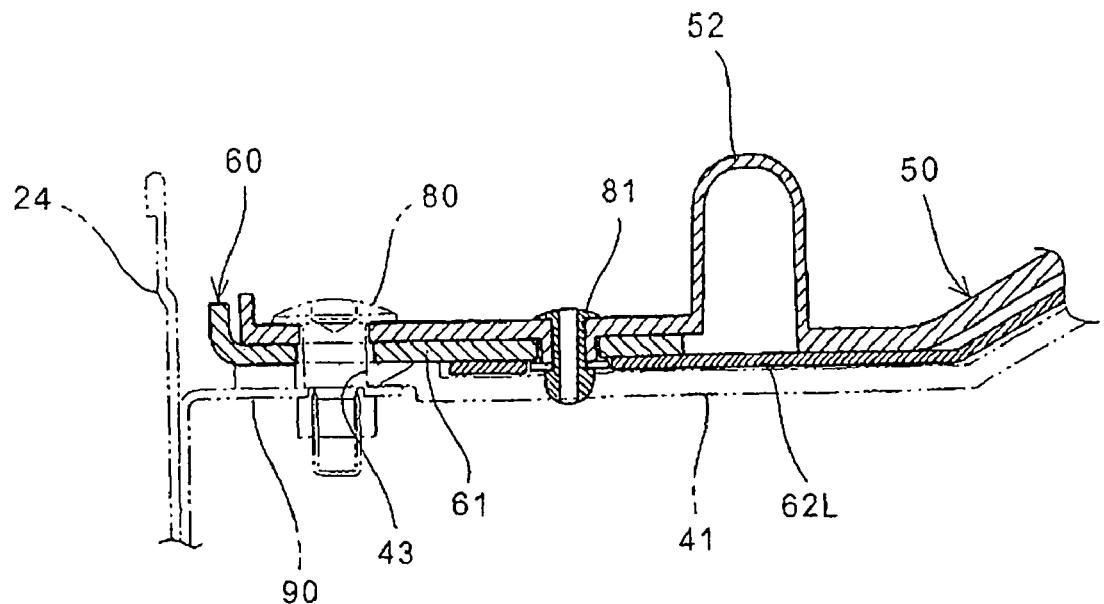
FIG. 7 is a cross sectional view taken along the line A-A of FIG. 4.

FIG. 7 is a cross-sectional view taken along the line A-A of FIG. 4. As illustrated therein, a bolt 80 penetrates the through-hole 53 of the top shelter center 50, the through-hole 64 formed in the middle member 61 of the fixation plate 60. A through-hole 43 is formed in the extension part 41 of the left-side top shelter 40 with a stay 90 to be coupled to a plate member of the casing 24 on the rear side of the vehicle body. Thereafter, the bolt 80 is fastened with a nut or the like. A grommet 81 is configured to penetrate the through-hole 54 of the top shelter center 50 and the through-hole 65 formed at the welding-connection portion of the fixation plate 60 so as to fasten the both. With the configuration as described above, the fixation plate 60 is indirectly coupled to the frame 2 of the motorcycle 1, and is stably supported by the vehicle body.

Figure 8:
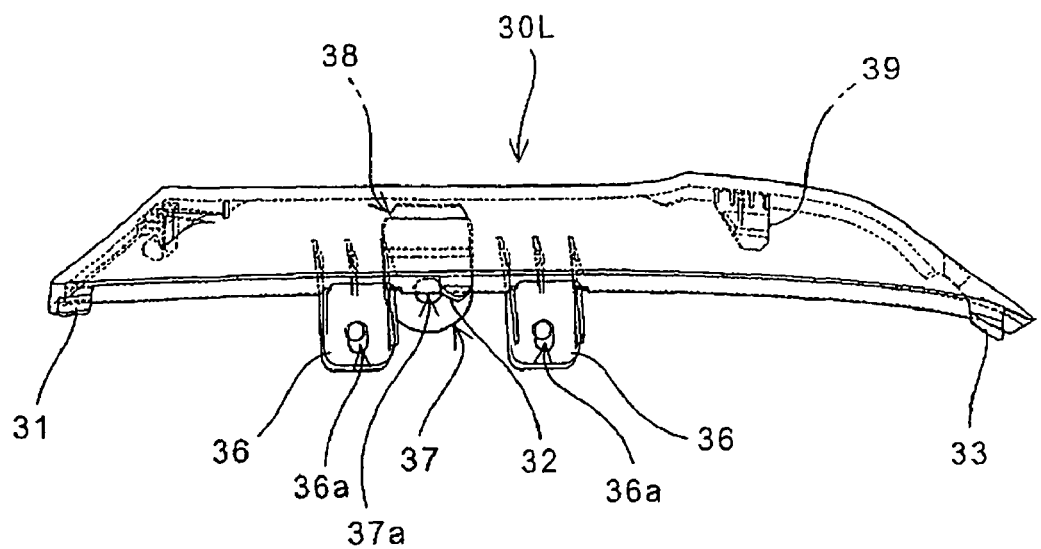
FIG. 8 is a side view of the belt cover according to the embodiment of the present invention.

FIG. 8 is a side view of the left-side belt cover 30L. Reference numerals identical to the above denote identical or equivalent parts. The stay 37 formed on the back surface of the left-side belt cover 30L is inserted into the engaging groove 56 of the top shelter center 50, and has a function of fixing the left-side belt cover 30L to the top shelter center 50 with a fastening member (not shown) penetrating a through hole 37a. A fragile part 38 whose width and thickness are reduced is provided at the base of the stay 37. When the airbag 14 swells and expands, the fragile part 38 is ruptured by a force generated when the support belt 15 is pulled out. Accordingly, the left-side belt cover 30L is configured to be removed from the accommodation part 47 while expanding with the engaging pawls 31, 32, and 33, that is, one side of the left-side belt cover 30L outside in the vehicle-width direction, serving as an axis. The shape of the fragile part 38 can be variously modified, and accordingly a load necessary for expanding the belt cover 30L can be adjusted. Further, attachment holes 36a are formed in the respective wire attachment stays 36 to which both ends of the wire 70 are connected.

FIG. 9 is a cross sectional view (a) taken along the line B-B of FIG. 4, and a front view (b) of a wire fastening member. A drum 71 is coupled to one end of the wire 70, and is held by a wire fastening member 72 in which a wire through-groove 74 is formed. The attachment hole 36a of the wire attachment stay 36 which is formed on the back surface of the left-side belt cover 30L is fastened to a through-hole 73 which is formed in the wire fastening part 72 using a grommet 82. Accordingly, the wire 70 is connected to the left-side belt cover 30L. An end of the sheet 34 outside in the vehicle-width direction is also fixed together thereto through the grommet 82.

FIG. 10 is a cross-sectional view taken along the line C-C of FIG. 4. A through-hole 52a to which the stay 37 of the belt cover 30L is fastened is formed on a wall face of the cylindrical part 52 of the top shelter center 50 inside in the vehicle-width direction. As illustrated therein, the support belt 15 is accommodated in the accommodation part 47 in a folded manner prior to swelling and expansion of the airbag 14. The cylindrical part 52 is shaped so that a dimension in the up-down direction of a accommodation space is reduced at a substantially middle portion in the longitudinal direction of the accommodation part 47. Thus, the support belt 15 is stably accommodated at a predetermined position even when an impact and the like at the time of driving are applied.

As described above, according to the airbag system of the motorcycle of the present invention, the belt covers covering the accommodation parts for the support belts are coupled to the wires and the fixation plates which are arranged inside the accommodation parts and which are coupled to the vehicle body. Accordingly, when the belt covers are removed from the accommodation parts along with swelling and expansion of the airbag, it is possible to prevent the belt covers from dropping off from the vehicle body, and from flying apart in an unexpected direction. Since the wires are accommodated inside the accommodation parts prior to swelling and expansion of the airbag, the appearance properties of the motorcycle can be maintained.

It is obvious that the shapes and materials of the top shelters, the top shelter center, the accommodation parts, the belt covers, the fixation plates, and the wires can be variously modified without being limited to the above-described embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag system for a motorcycle, comprising:
   an accommodation part in which a support belt for coupling an airbag to a vehicle body is accommodated; and
   a cover for covering the accommodation part from above;
   wherein the cover is configured to be removed from the accommodation part along with swelling and expansion of the airbag, and a string-shaped member having only two ends for coupling the vehicle body and the cover is provided inside the accommodation part in order to restrict a range where the cover is removed,
   wherein each of the two ends of the string-shaped member is fixed to the cover and an intermediate portion of the string-shaped member between the two ends is loosely coupled to the vehicle body.

2. The airbag system for a motorcycle according to claim 1, wherein a part of the string-shaped member projects inside the accommodation part, and is coupled to a plate which is fixed to a frame of the vehicle body.

3. The airbag system for a motorcycle according to claim 2, wherein:
   the string-shaped member is a wire made of metal;
   the plate is a metal component having a through-hole provided therein; and
   the wire is inserted into the through-hole to be coupled to the vehicle body at a position adjacent to one lateral side of a top shelter center of the motorcycle.

4. The airbag system for a motorcycle according to claim 1, wherein the plate is a fixation plate including an outer member adapted to be secured to a vehicle body and a string-shaped member holding part extending therefrom.

5. The airbag system for a motorcycle according to claim 4, wherein the holding part includes apertures for receiving the string-shaped member therein for retaining the string-shaped member relative to a vehicle of the body.

6. The airbag system for a motorcycle according to claim 4, wherein the fixation plate includes left and right holding parts with apertures in each of the holding parts for receiving the string-shaped member therein for retaining the string-shaped member relative to a frame of the vehicle body.

7. The airbag system for a motorcycle according to claim 4, wherein the fixation plate includes a middle member with left and right outer members extending therefrom, said middle member including apertures for receiving attaching members for securing the middle member to a stay, said stay being retained relative to a frame of the vehicle body.

8. The airbag system for a motorcycle according to claim 1, wherein the cover includes apertures for receiving the string-shaped member for restricting the range of displacement of the cover relative to the vehicle body.

9. The airbag system for a motorcycle according to claim 1, wherein the cover includes a stay projecting therefrom adapted to be inserted in an engaging grove formed in a top shelter cover.

10. The airbag system for a motorcycle according to claim 9, wherein said stay includes a fragile portion adapted to rupture when a force is applied thereto when the airbag is deployed.

11. An airbag system for a motorcycle, comprising:
    an accommodation part for accommodating a support belt for coupling an airbag to a vehicle body; and
    a cover for covering the accommodation part, said cover being configured to be removed from the accommodation part along with a deployment of the airbag; and
    a cover retaining member with only two ends for coupling the cover to the vehicle body, said cover retaining member being provided within the accommodation part in order to restrict a range of movement of the cover when the cover is removed,
    wherein each of the two ends of the cover retaining member is fixed to the cover and an intermediate portion of the single member between the two ends is loosely coupled to the vehicle body.

12. The airbag system for a motorcycle according to claim 11, wherein a part of the cover retaining member projects inside the accommodation part, and is coupled to a plate which is fixed to a frame of the vehicle body.

13. The airbag system for a motorcycle according to claim 12, wherein:
    the cover retaining member is a wire made of metal;
    the plate is a metal component having a through-hole provided therein; and
    the wire is inserted into the through-hole to be coupled to the vehicle body at a position adjacent to one lateral side of a top shelter center of the motorcycle.

14. The airbag system for a motorcycle according to claim 11, wherein the plate is a fixation plate including an outer member adapted to be secured to a vehicle body and a cover retaining member holding part extending therefrom.

15. The airbag system for a motorcycle according to claim 14, wherein the holding part includes apertures for receiving the cover retaining member therein for retaining the cover retaining member relative to a frame of the vehicle body.

16. The airbag system for a motorcycle according to claim 14, wherein the fixation plate includes left and right holding parts with apertures in each of the holding parts for receiving the cover retaining member therein for retaining the cover retaining member relative to a frame of the vehicle body.

17. The airbag system for a motorcycle according to claim 14, wherein the fixation plate includes a middle member with left and right outer members extending therefrom, said middle member including apertures for receiving attaching members for securing the middle member to a stay, said stay being retained relative to a frame of the vehicle body.

18. The airbag system for a motorcycle according to claim 11, wherein the cover includes apertures for receiving the cover retaining member for restricting the range of displacement of the cover relative to the vehicle body.

19. The airbag system for a motorcycle according to claim 11, wherein the cover includes a stay projecting therefrom adapted to be inserted in an engaging grove formed in a top shelter cover.

20. The airbag system for a motorcycle according to claim 19, wherein said stay includes a fragile portion adapted to rupture when a force is applied thereto when the airbag is deployed.

* * * * *